United States Patent
Heinbuch et al.

(10) Patent No.: US 11,171,457 B2
(45) Date of Patent: Nov. 9, 2021

(54) HOLDER FOR SLIP RING BRUSHES

(71) Applicant: Schleifring GmbH, Fürstenfeldbruck (DE)

(72) Inventors: Peter Heinbuch, Fürstenfeldbruck (DE); Christian Holzapfel, Fürstenfeldbruck (DE); Marvin Doll, Grafrath (DE); Johannes Katz, Schwabach (DE)

(73) Assignee: SCHLEIFRING GMBH, Fürstenfeldbruck (DE)

( * ) Notice: Subject to any disclaimer, the term of this patent is extended or adjusted under 35 U.S.C. 154(b) by 0 days.

(21) Appl. No.: 17/165,411

(22) Filed: Feb. 2, 2021

(65) Prior Publication Data

US 2021/0159652 A1     May 27, 2021

Related U.S. Application Data

(63) Continuation of application No. PCT/EP2019/071120, filed on Aug. 6, 2019.

(30) Foreign Application Priority Data

Aug. 7, 2018 (EP) .................................. 18187738

(51) Int. Cl.
*H01R 39/38* (2006.01)
*H01R 39/27* (2006.01)
(Continued)

(52) U.S. Cl.
CPC ........... *H01R 39/381* (2013.01); *H01R 39/27* (2013.01); *H01R 39/39* (2013.01); *H02K 5/141* (2013.01)

(58) Field of Classification Search
CPC ...... H01R 39/381; H01R 39/27; H01R 39/39; H01R 39/388; H01R 39/386;
(Continued)

(56) References Cited

U.S. PATENT DOCUMENTS 349,999 A * 9/1886 Rice, Jr. .................. F21V 1/00
                                                     362/367
423,309 A * 3/1890 Chamberlain ....... H01R 39/381
                                                     310/246
(Continued)

FOREIGN PATENT DOCUMENTS

CN      105470766     *    4/2016
CN      103733445        12/2017
(Continued)

OTHER PUBLICATIONS

International Search Report and Written Opinion of PCT/EP2019/071120 dated Dec. 12, 2019.
(Continued)

*Primary Examiner* — Ahmed Elnakib
(74) *Attorney, Agent, or Firm* — Norton Rose Fulbright US LLP

(57) ABSTRACT

A brush holder for slipring brushes comprises a brush mount held by a lever at a base. The lever is connected by a base pivot to the base and is pivotable in a plane orthogonal to a brush mount pivot axis and/or to a slipring rotation axis. A spring is provided between the base and the lever. The brush mount is connected to the lever by a brush mount pivot pivotable in said plane. The brush mount holds a first brush and a second brush wherein the brush mount pivot is between the first brush and the second brush.

56 Claims, 7 Drawing Sheets

(51) Int. Cl.
*H01R 39/39* (2006.01)
*H02K 5/14* (2006.01)

(58) Field of Classification Search
CPC ...... H01R 39/385; H01R 39/38; H01R 39/20; H02K 5/141; H02K 5/148; H02K 5/146; H02K 5/145; H02K 5/143; H02K 5/14
USPC .......................................................... 310/239
See application file for complete search history.

(56) References Cited

U.S. PATENT DOCUMENTS

| | | | | |
|---|---|---|---|---|
| 717,656 | A * | 1/1903 | Beeler | H01R 39/381 310/246 |
| 747,890 | A * | 12/1903 | McElroy | H01R 39/381 310/246 |
| 2,520,379 | A * | 8/1950 | Ward | H01R 39/27 310/246 |
| 4,350,909 | A * | 9/1982 | Yamada | H01R 39/20 174/126.2 |
| 4,359,656 | A * | 11/1982 | Fasterding | H02K 19/365 310/239 |
| 2005/0029896 | A1 | 2/2005 | Stewart et al. | |

FOREIGN PATENT DOCUMENTS

| | | |
|---|---|---|
| DE | 717781 | 2/1941 |
| DE | 967293 | 10/1957 |
| DE | 7100971 | 4/1971 |
| EP | 3364508 | 8/2018 |
| FR | 530801 | 12/1921 |
| GB | 15471 | 2/1913 |
| GB | 146828 | 7/1921 |
| GB | 290002 | 5/1928 |
| RO | 92696 | 9/1987 |

OTHER PUBLICATIONS

Communication pursuant to Rules 161(1) and 162 EPC of European Patent Application No. 19746108.0 dated Feb. 25, 2020.
Response to Communication pursuant to Rules 161(1) and 162 EPC of European Patent Application No. 19746108.0 filed Apr. 15, 2020.
Notice of Intent to Grant—Communication under Rile 71(3) EPC and Text Intended for Grant of European Patent Application No. 19746108.0 dated Jul. 6, 2020.
Decision to Grant a European patent pursuant to Article 97(1) EPC of European Patent Application No. 19746108.0 dated Sep. 24, 2020.
Office Action issued in corresponding Chinese Application No. 201980052331.0, dated Aug. 18, 2021 (Chinese).

* cited by examiner

HOLDER FOR SLIP RING BRUSHES

CROSS-REFERENCE TO RELATED APPLICATIONS

This application is a continuation of pending International Application No. PCT/EP2019/071120 filed on Aug. 6, 2019, which designates the United States and claims priority from European Application No. 18187738.2 filed on Aug. 7, 2018, both of which are incorporated herein by reference.

BACKGROUND

1. Field of the Invention

The invention relates to slipring brushes and holders for slipring brushes, specifically for applications where a long lifetime and a high current load are required. Such slipring brushes may be used with sliprings for energy transmission or signal transmission as well as collectors of motors or generators.

2. Description of Relevant Art

In the US patent application publication US 2005/0029896 A1, a brush holder for holding carbon brushes against the commutator of a DC motor is disclosed. The brush is slideably held in a housing and pressed by a spring against the commutator. With increasing wear of the brush, the brush slides downwards through the housing which causes the spring to reduce its length and to reduce the force against the brush. Therefore, the pressure of the slipring brush decreases with time, which leads to changing electrical contact characteristics.

The German patent DE 967 293 discloses a brush for electrical machines, wherein a piece of carbon brush material is pressed against a slipring by means of a spring-loaded lever. To achieve a constant pressure, a long spring and a long lever is required, which makes the brush holder large.

A brush holder with a pivotable ball mounting of the brush is disclosed in GB 146, 828. The ball mounting enables tilting in two axis and rotation of the brush. This requires concave formed collector rings and convex formed brushed adapted thereto.

Further brush holders are disclosed in DE 71 00 971 U, CN 105 470 766 A and FR 530 801 A. RO 92696 A2 discloses a slipring brush holder, where the brush is pivotable about two axes which are neither parallel nor orthogonal.

EP 3 364 508 A1 discloses a holder for slipring brushes.

SUMMARY

The embodiments are providing a holder for slipring brushes which is comparatively compact in size and provides an approximately constant pressure over the lifetime of a brush, independent of the wear of the brush.

In an embodiment, a brush holder includes a base, a lever, and a brush mount. The base is the main body which may be used to mount the brush holder to a brush holder assembly, and which may also bear an electrical contact or connector for electrical connection. Dependent on the specific application, the base may either be of a conductive or a nonconductive material. In the case of high current brushes it may be desirable to make the base of metal which gives a high stability and enables a simple contacting and current guidance through the base. Alternatively, it may be desirable to have a high insulation. Therefore, the base may be made of an insulating material. Furthermore, an insulating material like a plastic material has less weight than a metal body. In any case, the main function of the base is a mechanical function for supporting and holding the other components of the brush holder.

The brush mount is a component for holding at least one brush and preferably two brushes. Such brushes may be any brushes known in the art, like a sintered graphite or silver-graphite material. The brushes may also include bundles of wires or other suitable materials or a sintered carbon material. There may be also only one brush like a foam metal brush or a plurality of such brushes. Preferably, the brush mount includes a conductive material to improve conduction of electrical current to the brushes. If desired, here also an insulating material may be used. In normal applications, the brushes on a single brush mount run on the same sliding track. Therefore, they may be electrically connected, which may best be done by using a conductive material of the brush mount. The brush mount itself or the brushes at the brush mount may be electrically contacted by a litz wire or any other flexible wire which may guide the current to and through the brushes.

A lever is provided to mechanically connect the brush mount to the base. There is a base pivot for connecting the lever to the base. This base pivot has a base pivot axis. When such a brush holder is mounted to a slipring also called slipring module including sliding tracks, the base pivot axis may be parallel to the rotation axis of a cylinder shaped slipring and parallel to the plane of the tracks in a disc type slipring.

The lever may also be connected to the brush mount by a brush mount pivot having a first pivot axis parallel to the base pivot axis and preferably having a second pivot axis orthogonal to the first pivot axis. The second pivot axis may be orthogonal to a plane through the rotation axis of a cylindrical slipring. The second pivot axis may not be orthogonal to the rotation axis of the cylindrical slipring. Therefore, the brush mount may be tiltable against a sliding track surface, but not rotatable out of the direction of movement of the sliding track. Such a rotation may be blocked. According to an embodiment, the brush mount pivot may be configured to pivot only about an axis parallel to the base pivot axis. According to a further embodiment, the brush mount pivot may further be pivotable around an axis parallel to a sliding track plane which will be defined later in detail.

The spring, which may be a tension spring and/or a coil spring, is connected between the base and the lever such that the brush mount pivot increases its distance to the base under the force of the spring. Accordingly, the brush mount and therefore the brush mount pivot may be pulled by the spring in a direction away from the base, and if properly installed relative to a slipring, asserts force against the sliding track of a slipring. The spring may be arranged parallel to the base. The spring may be longer than the lever in any operative state.

The lever may include a first lever section which holds the brush mount and a second lever section to which the spring is attached. The other side of the spring is attached to the base. The base pivot is between the first lever section and the second lever section. The angle between a first line between the spring attachment point and the base pivot axis and a second line between the brush mount pivot axis and the base pivot axis may be in a range between 90° and 120°, preferably between 80° and 120°. With such a configuration the direction of forces can be changed and the overall size may be reduced. With different lengths of the lever sections, the amount of force may also be modified. The second lever section may be shorter than the first lever section.

In an embodiment, wherein the brush mount includes at least two brush fixation means and wherein the brush mount pivot may be arranged between the brush fixation means, the brush mount will pivot in such a position that both brushes are pressed against a sliding track. This tiltable dual brush mount therefore automatically aligns with the position of the sliding track and may easily compensate for variations in height or even relative position between the brush holder and the sliding track. It may even compensate for a sideward offset within the surface of the sliding track.

The brush fixation means may include a sleeve or rivet or a hole or thread to mount a brush to the brush mount. The fixation means also may include a fixation by gluing, soldering or welding the brush to the brush mount. Also, the brush may be clamped or press fitted to the brush mount. In another embodiment, the brush may include a metal foam, which may further include silver, gold, copper, brass or any other conductive material with good contact characteristics. Preferably, open pore foam may be used, but also a close pore foam is suitable for this embodiment. Preferably, such a foam may be soldered to a thin sheet of copper or any other conductive material.

The distance between the first brush fixation means and the brush mount pivot may be larger than the distance between the second brush fixation means and the brush mount pivot for at least 10%, preferably between 20% and 50%.

In an embodiment, an active brush contact area on a first side of the brush mount pivot is larger than an active brush contact area on a second side of the brush mount pivot for at least 10% or between 20% and 50%. An active brush contact area is an area of the brush with a slipring during operation.

In a further embodiment, a litz wire is provided between the brush mount and the base. The litz wire may be used for contacting the brushes and for guiding current to the brushes. The litz wire may be guided within the coil spring. This may bring an additional damping to the spring, which may improve mechanical characteristics. The litz wire may be formed as ribbon wire, it can be bare or isolated.

In an embodiment, the lever may be a rigid lever. A rigid or stiff lever may allow to bring high pressure forces to the brushes without deformation of the lever.

In another embodiment, the lever includes a plurality of encapsulated hollow spaces to reduce the lever weight. It may include at least one of a foam, a mesh structure, a honeycomb structure, a truss framework (Fachwerk) or a lightweight construction with structures along the lines of force or a similar 3-D printed structure. There may be closed or encapsulated hollow spaces to avoid a large surface area of the lever to which dust and debris may adhere. Furthermore, such hollow spaces which may collect dust and debris within the lever may be avoided, if a high insulation is desired, as conductive dust collected therein may reduce electrical insulation and add weight to the lever (from the dust material). Encapsulated hollow spaces reduce the weight and the inertia of the lever while preventing the collection of conductive debris. There may be a structure, close at at least one side.

In an alternate embodiment, the lever may be an elastic lever which may be bendable only in a movement plane orthogonal to a brush mount pivot axis and/or to a slipring rotation axis of a cylindrical slipring and/or orthogonal to a track surface of a disc shaped slipring. Furthermore, the lever may be firmly connected to the base. Preferably, the spring constant of the lever may be designed such that it produces a desired force on the brushes. Furthermore, the brush mount may be connected to the lever by a brush mount pivot, a pivot axis parallel to the base pivot axis as already described above. Therefore, this embodiment also has the same advantages as the embodiment above. The lever may include an elastic material and preferably a spring-elastic material. This may be spring, steel, or brass material. The lever may be configured to conduct current which would simplify the electrical connection of the brushes.

In an embodiment, the lever includes two parallel wires. Preferably, the wires are parallel to a plane through a brush mount pivot axis and/or a plane through a slipring rotation axis of a cylindrical slipring. These parallel wires allow movement of the lever only in a plane orthogonal to a brush mount pivot axis and/or to a slipring rotation axis and not outside of the plane, and therefore provide a stable bearing of the brushes. The wires may be elastic and may provide spring properties which may be used to press the brush or brushes to a sliding track. The wires may also be used for electrically contacting the brushes.

In the following, further embodiments are explained which may be combined with the different embodiments of the lever as mentioned above.

In a further embodiment, the brush mount is pivotable about an axis parallel to the base pivot axis and/or in a plane orthogonal to a brush mount pivot axis and/or to the slipring rotation axis of a cylindrical slipring and/or orthogonal to a track surface of a disc shaped slipring. The angle of movement may be limited to a range of 30 degrees, preferably 20 degrees and most preferably 10 degrees.

The first brush fixation means and the second brush fixation means may define a sliding track plane. This is only a matter of definition and no real plane. This sliding track plane may tangentially contact the surface of a sliding track.

The brush mount pivot may further be configured to pivot around an axis parallel to the sliding track plane. This may allow for compensation of sideward tilts of the sliding track. In a further embodiment, a rotation blocking means is provided for blocking a rotation of the brush mount pivot around an axis orthogonal to the sliding track plane. This may further increase stability and guidance of the brushes.

In a further embodiment, the leading brush or brush section may be located further distant from the brush mount pivot than the trailing brush or brush section. The leading brush is the brush where a certain section of a sliding track passes first. This section of the sliding track later passes the trailing brush.

BRIEF DESCRIPTION OF THE DRAWINGS

In the following, the invention will be described by way of example, without limitation of the general inventive concept, on examples of embodiment and with reference to the drawings.

Figure 1:
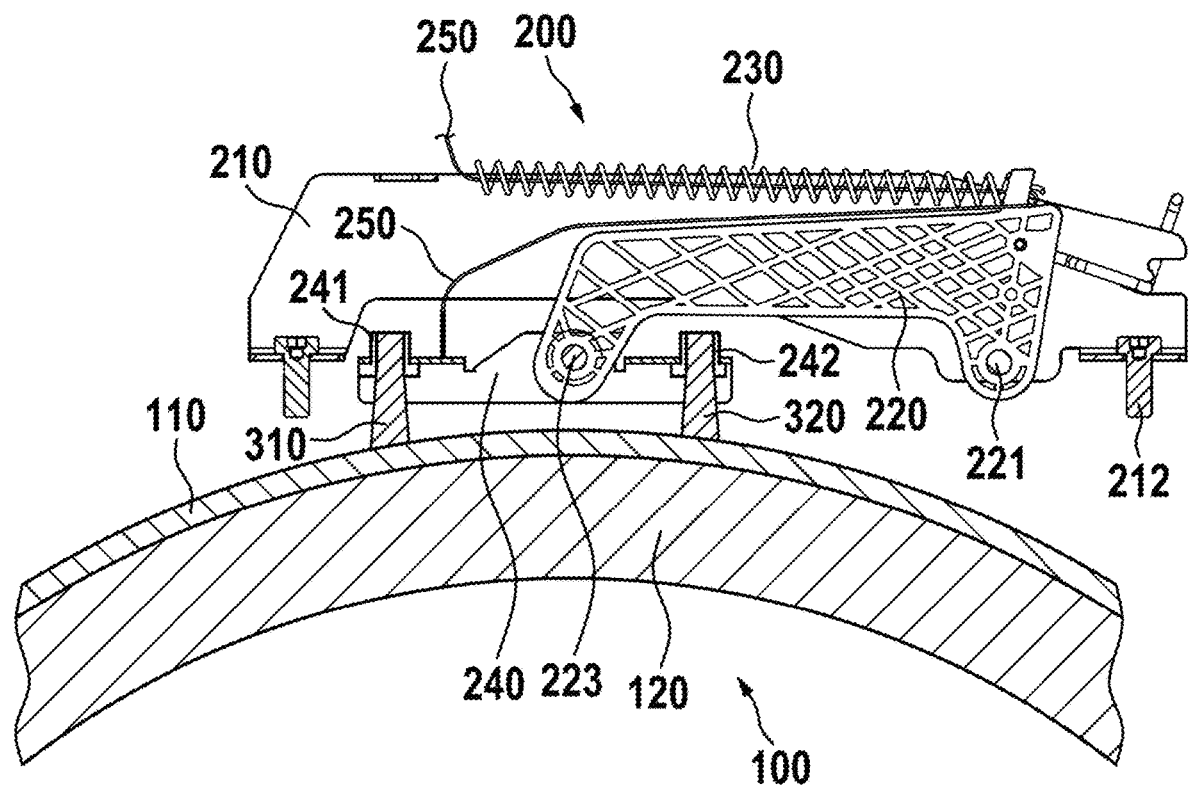
FIG. 1 shows an embodiment of a brush holder.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 10:
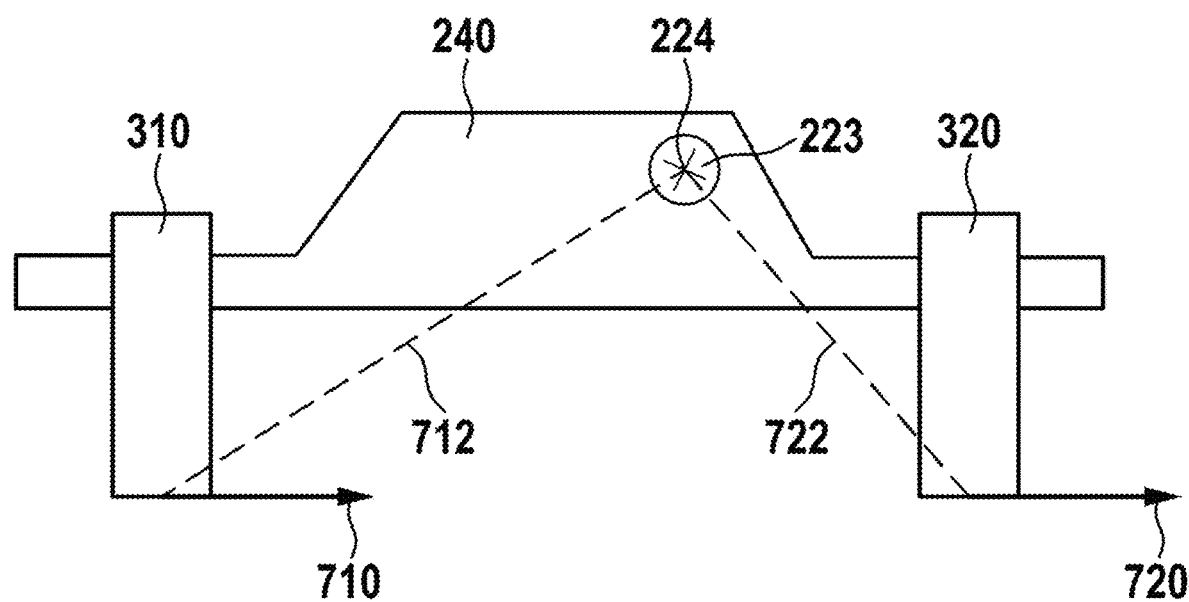
FIG. 10 shows different forces at the brush holder.

In FIG. 1, an embodiment of a brush holder is shown. Further details of forces are shown in FIG. 10. The brush holder 200 includes a base 210, a lever 220, and a brush mount 240. The base may be mounted to a slipring housing and preferably in a fixed spatial relationship to a rotation axis 130 of a slipring. The lever may have extension from a first side to a second side and may be with a first side mechanically connected to the base by a base pivot 221 which preferably has only a base pivot axis 222 (shown in FIG. 3). The base pivot axis may be parallel to the rotation axis 130. The brush mount 240 may be connected to the second side of the lever 220 by a brush mount pivot 223 which may have a brush mount pivot axis 224. The brush mount pivot axis 224 may be parallel to the base pivot axis 222.

A spring 230, which may be a spiral spring, may be arranged between the base 210 and the lever 220, such that it may pull the lever such that the brush mount may be pushed away from the base which may be into the direction of a sliding track 110 which may be part of the slipring 100. The slipring further may include an insulating support 120 which holds the sliding track. The slipring may be configured to rotate about a rotation axis 130.

In an embodiment, to achieve a constant force even with a brush shortened by wear it is of advantage to have a long spring so that in all operating states and even with worn brushes the spring force is nearly constant. This configuration is shown here in FIG. 1 with the spring parallel to the base to achieve a low height of the brush holder 200.

The brush mount 240 may include at least a first brush fixation means 241 and may further include a second brush fixation means 242. The brush fixation means may hold a first brush 310 and a second brush 320. A litz wire 250 or a plurality of such litz wires may be contacted with the brushes for an electrical connection of the brushes. The litz wire may be arranged within the coil spring.

The lever 220 may be limited in its movement within a first plane 400 orthogonal to the base pivot axis 222. The brush mount 240 may be movable only in the first plane 400 which may be orthogonal to the brush mount pivot axis 224, and/or orthogonal to the base pivot axis 222, and/or orthogonal to the rotation axis 130 of the slipring. The first plane 400 is in this figure parallel to and/or within the drawing plane. It may be beneficial, if the brush mount cannot move out of this first plane 400. This avoids vibrations and oscillations. As the brush mount and the brushes may not move sideward of a sliding track (e.g. out of a plane orthogonal to base pivot axis 222), no sidewalls of sliding tracks may be required. There may be no more wear due to a sliding brush sliding along such track sidewalls. The brush mount 240 may also be blocked from tilting or rotating out of the first plane 400 such that the first brush moves in a direction above the first plane and the second brush moves in a direction below the first plane or vice versa. This may ensure that the first brush 310 and the second brush 320 run in the same track without sideward displacement.

Figure 5A:
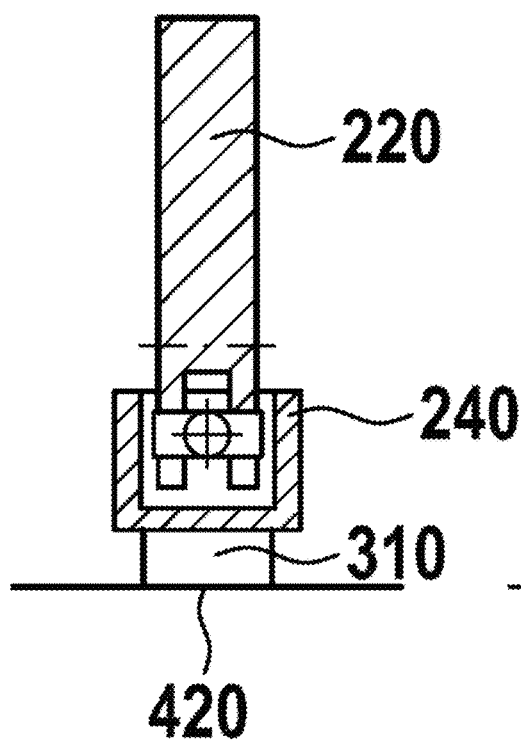
FIGS. 5A and 5B show a front cutaway view of an embodiment of brush holder with a pivot for a slanted sliding track plane (FIG. 5B).

The only possible movement of the brushes may be in a parallel direction out of the first plane such that both brushes move in a direction above the first plane at the same time or below the first plane at the same time as shown in FIG. 5A.

Figure 8:
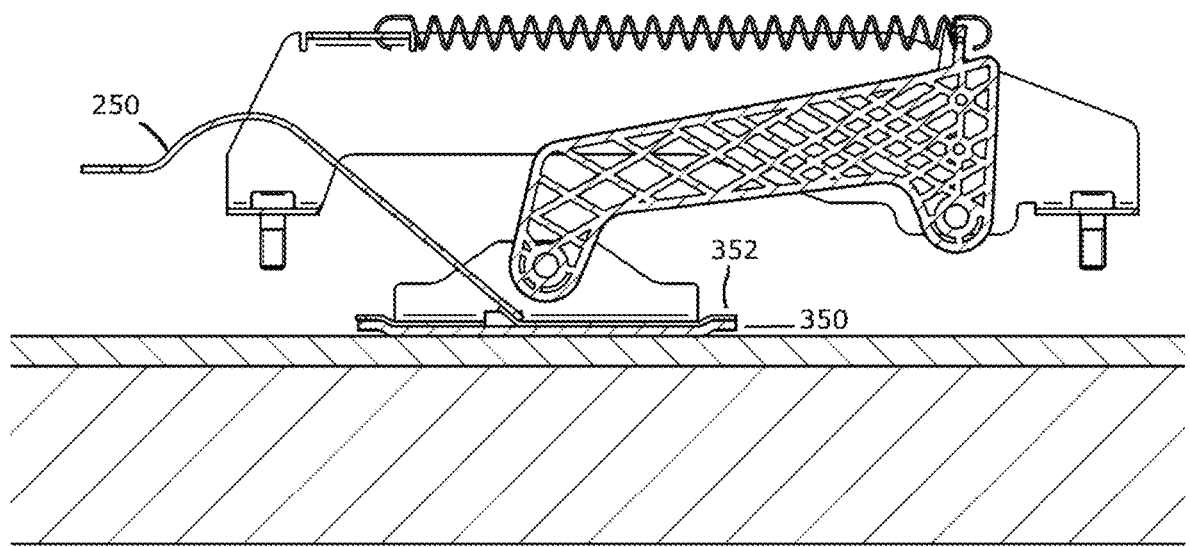
FIG. 8 shows an embodiment with a metal foam brush.

The embodiments described herein with a first brush 310 and a second brush 320 may also apply to a single elongated brush which may have a first brush section and a second brush section opposing to the first brush section. Such a configuration is shown in FIG. 8.

Now, reference is further made to FIG. 10. The first brush 310 and the second brush 320 by their frictional forces 710, 720 induce a torque into the brush mount pivot when the slipring is rotating. In this figure the direction of rotation may be clockwise. To provide at least a partial torque compensation, the leading brush, which may be first brush 310 may be located further distant 712 from the brush mount pivot 223 in comparison to the distance 722 of the trailing brush, which may be second brush 320 to the brush mount pivot as shown in FIG. 1. Therefore a torque and an additional force component to each brush is generated. When the slipring rotates clockwise, the leading first brush is additionally loaded with the force induced by the brush friction torque, the trailing brush is less loaded since the spring induced force is reduced by the brush friction momentum at this point. Due to the asymmetric position of the brush mount pivot 223 relative to the first brush 310 and the second brush 320, a higher force is applied to the second brush 320, compared to the first brush 310. This may compensate for the different forces generated by friction.

Summarizing, for improving torque compensation, the leading brush may be located further distant from the brush mount pivot than the trailing brush. This may be combined with all embodiments described herein.

If the slipring rotates in the opposite direction as shown (counterclockwise), then the brush mount pivot 223 may be arranged closer to the first brush 310 which then may be the trailing brush.

In case of changing directions of rotation, the brush mount pivot 223 may be symmetrically between the first brush 310 and the second brush 320.

Figure 2:
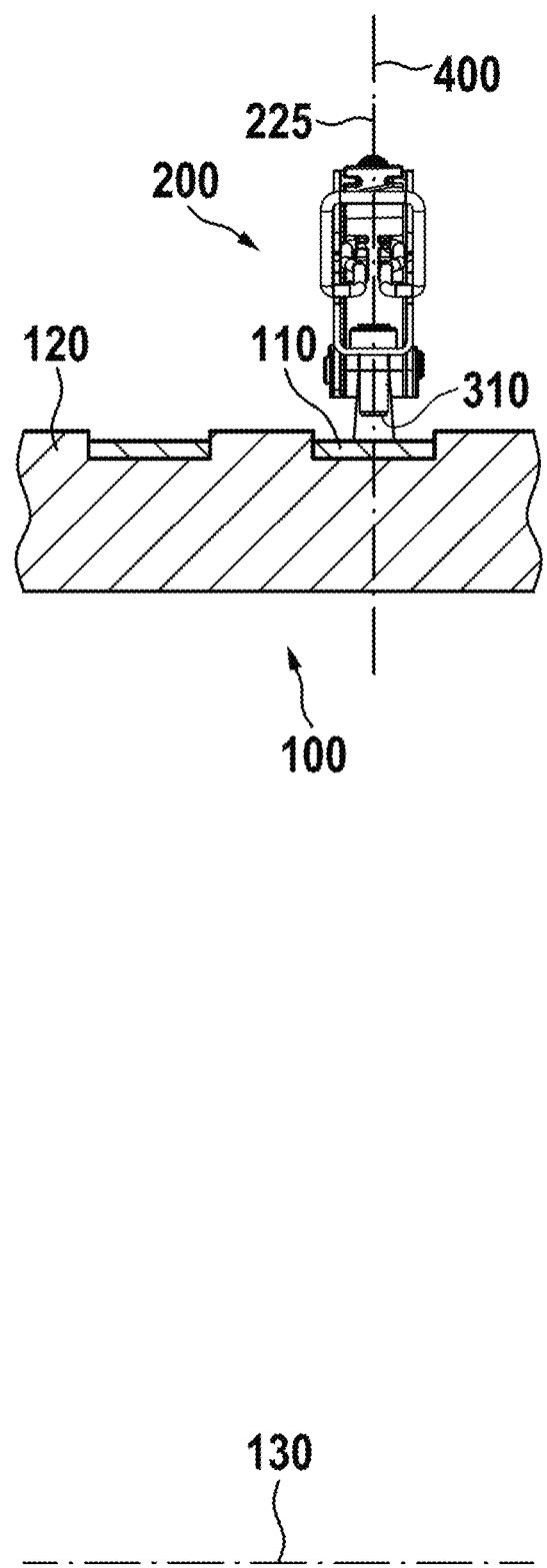
FIG. 2 shows a front view of a brush holder.

In FIG. 2, a front view of the brush holder of FIG. 1 is shown. Here, also the relationship to a slipring and its sliding tracks can clearly be seen. Now the plane orthogonal to a brush mount pivot axis and/or to a rotation axis 130 of the slipring preferably is orthogonal to the drawing plane and further orthogonal to the rotation axis 130 of the slipring. It is preferred if blocking means are provided to prevent a rotation of the brush mount about an axis 225 within the plane orthogonal to a brush mount pivot axis and/or to the rotation axis 130 of the slipring and orthogonal to the rotation axis 130 of the slipring. If the brush mount would rotate about the axis 225, the brushes may move sideward out of the sliding tracks, which would lead to a damage of the slipring and to an interruption of the electrical contact. Such blocking means may be overlapping areas of brush mount 240 and lever 220.

Figure 3:
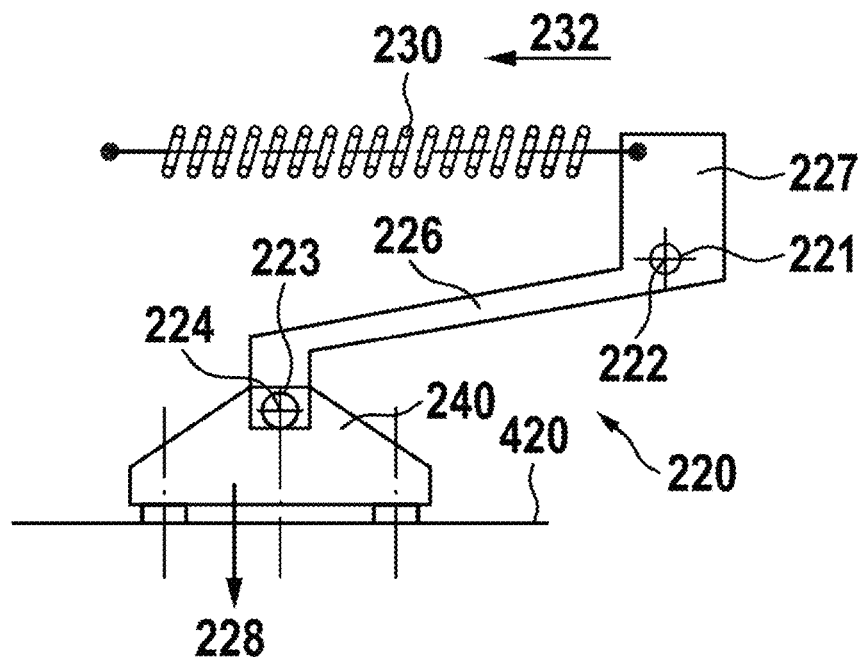
FIG. 3 shows the basic function of the lever.

In FIG. 3, the basic function of the lever is shown. The spring 230 may pulls and may generate a force into direction 232 which results in a force 228 on the brush mount 240, which is perpendicular to the sliding track. Preferably, the distance between the brush mount pivot axis 224 and the first brush fixation means 241 is the same as the distance between the brush mount pivot axis 224 and the second brush fixation means 242, such that the forces to the brushes are the same if the brushes have the same lengths. Normally, the sliding track is circular and has a certain radius as shown in FIGS. 1 and 2, for simplicity reasons in the following explanations, an infinite radius is assumed which may result in a plane, herein called the sliding track plane. Besides the application of the brush holder in a slipring arrangement, it may also be used to linear sliding tracks which also be represented by the sliding track plane.

Herein an embodiment of the lever 220 is shown. The spring 230 is attached to the lever 220 outside the section of the lever between the base pivot 221 and the brush mount pivot 223. The spring may provide a pulling force. The lever may include a first lever section 226 which holds the brush mount 240 and a second lever section 227 to which the spring 230 is attached. The other side of the spring is attached to the base 210. The base pivot 221 is between the first lever section 226 and the second lever section 227. Preferably, the angle between a second line between the spring attachment point and the base pivot axis 222 and a first line between the brush mount pivot axis 224 and the base pivot axis 222 is in a range between 80° and 120°. With such a configuration the direction of forces can be changed and the overall size may be reduced. With different lengths of the lever sections, the amount of force may also be modified. The second lever section 227 is shorter than the first lever section 226.

In this Figure, an optimized configuration is shown where the sliding track plane 420 is a leveled configuration. Basically, this leveled configuration may be freely chosen as long as there is a main component of force 228 perpendicular to the sliding track plane 420.

Figure 4:
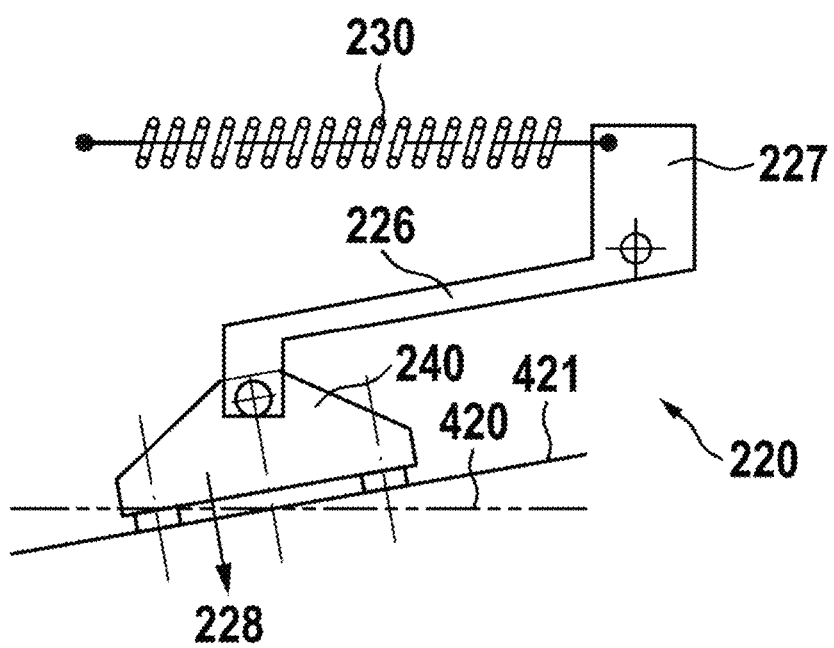
FIG. 4 shows an embodiment with a tilted plane.

In FIG. 4, an embodiment with a tilted plane is shown. Herein, the sliding track plane 420 is tilted and shown as tilted sliding track plane 421. This may easily be compensated by the brush mount which pivots about its first pivot axis accordingly, such that again both brushes are in contact with the plane. Accordingly, there is again a force 228 perpendicular to the tilted sliding track plane 421.

Figure 5B:
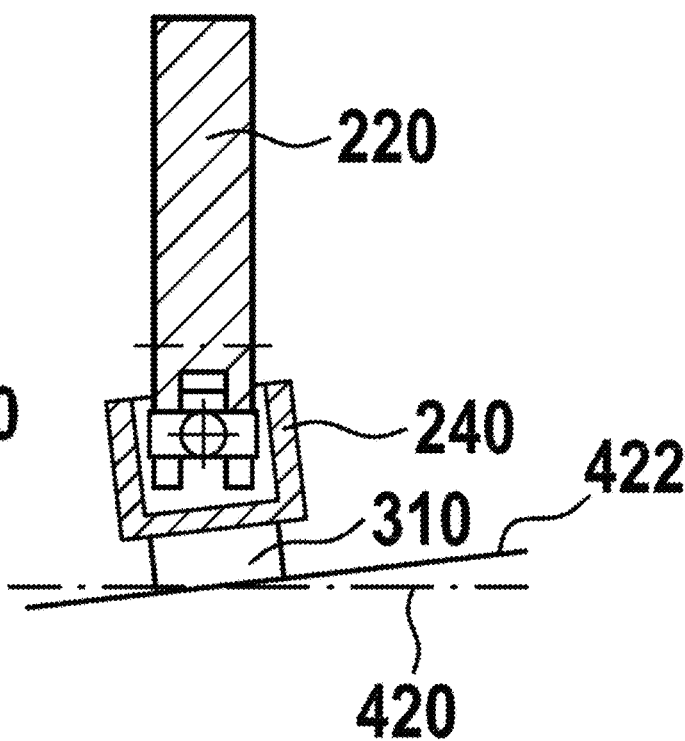

In FIG. 5B, an embodiment of a brush holder with a pivot for a slanted sliding track plane is shown. Herein, the sliding track plane 420 is in a slanted configuration and shown as slanted plane 422. This may occur if the rotation axis of the slipring is not precisely parallel to the base pivot axis. There may be a brush mount having a second pivot axis orthogonal to the first pivot axis to allow adaption of a slanted plane 422 such the brush always smoothly runs with its full contacting surface at the sliding track, and therefore provides the best possible contact. Otherwise, the brush may only run with an edge at the sliding track. This may be acceptable under certain circumstances, if the axis of the slipring is in a constant position non-parallel to the base pivot axis. In this case, with increasing wear of the brush, the brush would increase its contact surface to the sliding track, as the edge would be worn down. For the case the slipring is not eccentrical or moving otherwise, there would be a continuous movement and the angle of the slanted plane may change continuously, which would not allow to provide a constant wear of the brush, a normal slipring brush would have sever changing contact properties. With the above-mentioned embodiments of the brush holder, this may also be dynamically compensated, as the brush may easily follow the movements of the sliding track. There may be only the first and the second pivot axis at the brush mount. Preferably, other degrees of movement of the brush mount relative to the lever are not desired as they may lead to an instability and oscillations increasing brush wear.

Figure 6:
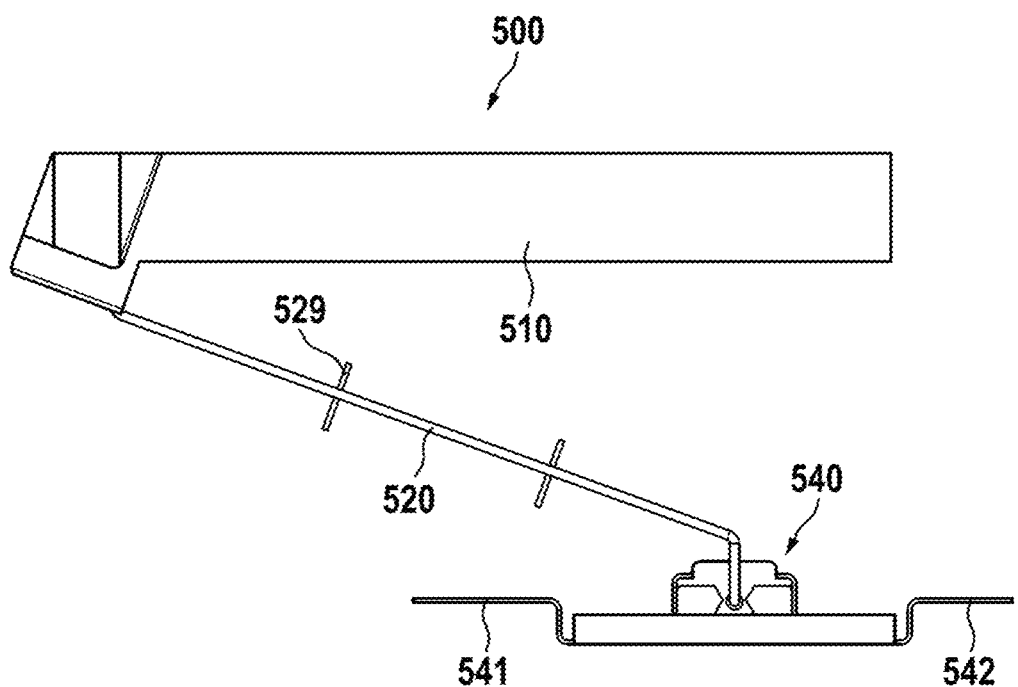
FIG. 6 shows a side view of an embodiment with a wire lever.

In FIG. 6 a side view of an embodiment of a brush holder 500 with an elastic lever 520 including wires is shown. The elastic lever 520 includes two parallel wires which are fixed together at their ends and which are parallel to a brush mount pivot axis and/or to a slipring rotation axis of a cylindrical slipring and/or parallel to a track surface of a disc shaped slipring. They may be injection molded or otherwise be fixedly held within the base 510. The wires may be one piece connected at the brush mount end. As the wires are connected together at both ends, they cannot twist and may only be bent in one plane (the plane orthogonal to a brush mount pivot axis and/or to a slipring rotation axis). Preferably, the spring constant of the lever is designed such that it produces a desired force on the brushes. Furthermore, the brush mount may be connected to the lever by a brush mount pivot 524, pivotable in a plane orthogonal to a brush mount pivot axis and/or to a slipring rotation axis as already described above. Therefore, this embodiment also has the same advantages as the embodiment above. The material of the spring may be spring, steel, or brass material. The lever may be able to conduct current which would simplify the electrical connection of the brushes. There may be spacers 529 at the wires for further stabilizing the wires.

Figure 7:
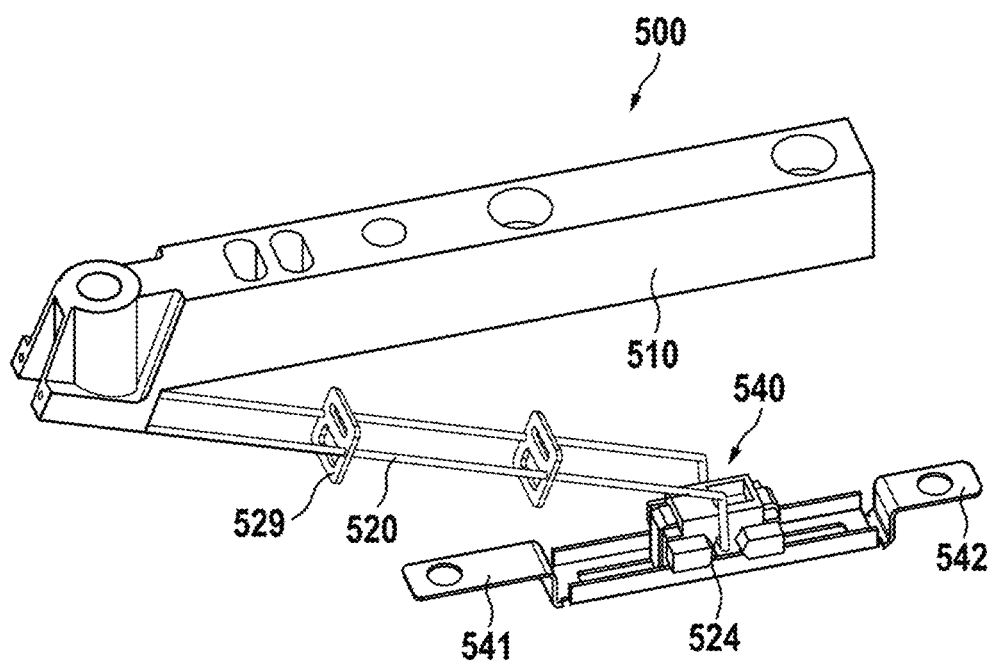
FIG. 7 shows a perspective view of an embodiment with a wire lever.

FIG. 7 shows a perspective view of an embodiment with a wire lever. It further shows the brush mount 540 with first brush fixation means 541 and second brush fixation means 542. These brush fixation means may hold a brush or a sleeve for holding a brush.

FIG. 8 shows an embodiment with a metal foam brush 350. The base and the lever are basically the same as shown in FIG. 1. There are a few exceptions like the foam brush which is mounted (preferably soldered or welded) to a foam brush carrier 352, which may be a sheet of copper or any other conductive material. Preferably, the foam brush carrier is connected to a litz wire which may be a wire as shown or a wire as shown in any of the other figures. The brush mount is also modified to hold the foam brush carrier and/or the foam brush. For this purpose, it preferably has a planar surface, which may be matched to at least one of the foam brush (with, length, radius) and/or the sliding track (width, radius). The foam brush carrier can be a part of the brush mount. Here a planar sliding track section is shown. It may be part of a linear sliding track or of a disc type planar slipring.

The same asymmetric position of the pivot axis as described under FIG. 1 is of advantage when a single brush is mounted with a contact area between brush and slipring extending to both sides of the brush mount pivot. Here a leading brush section may be located further distant from the brush mount pivot than a trailing brush section.

For a drum slipring module, the bottom side of the foam brush carrier may be bent to the radius of the sliding track.

Figure 9:
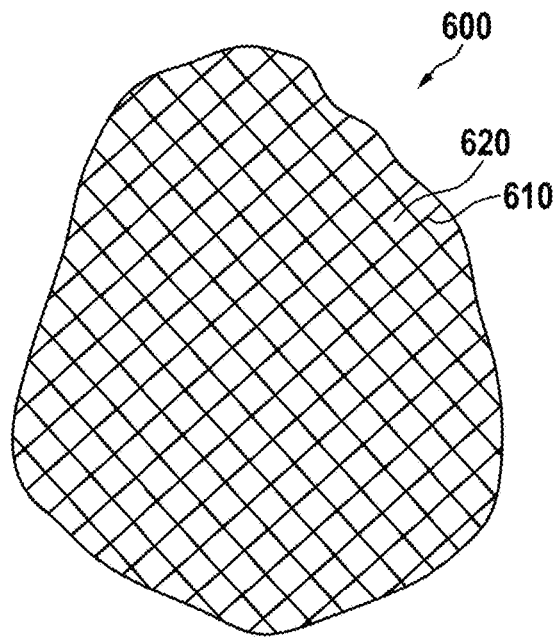
FIG. 9 shows a section of an embodiment of the lever.

FIG. 9 shows a section of an embodiment of the lever. A plurality of encapsulated hollow spaces 620 are contained between 3-D printed sidewalls 610. There are also parallel layers, e.g. a cover layer parallel to the drawing plane to close the hollow spaces.

FIG. 10 shows different forces at the brush holder and is further explained in detail in the section describing FIG. 1.

It will be appreciated to those skilled in the art having the benefit of this disclosure that this invention is believed to provide a brush holder for sliding brushes. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 slipring
110 sliding track
120 insulating support
130 slipring rotating axis
200 brush holder
210 base
212 fixation screw
220 lever
221 base pivot
222 base pivot axis
223 brush mount pivot
224 brush mount pivot axis
225 axis orthogonal to the rotation axis of the slipring
226 first lever section
227 second lever section
228 force to sliding track
230 spring
232 direction of spring force
240 brush mount
241 first brush fixation means
242 second brush fixation means
250 litz wire
310 first brush
320 second brush
350 metal foam brush
352 metal foam brush carrier
400 first plane
410 plane through brush fixation means
420 sliding track plane
421 tilted plane
422 slanted plane
500 brush holder
510 base
520 lever
524 brush mount pivot
529 spacer
540 brush mount
541 first brush fixation means
542 second brush fixation means
600 section of lever
610 sidewalls
620 encapsulated hollow spaces
710 frictional force of first brush
712 distance of first brush
720 frictional force of second brush
722 distance of second brush

The invention claimed is:

1. A brush holder comprising:
a brush mount held by a lever at a base, wherein the lever is pivotably connected by a base pivot to the base, the base pivot having a base pivot axis,
a spring disposed between the base and the lever,
wherein the lever is limited in its movement within a first plane orthogonal to the base pivot axis,
wherein the brush mount is connected to the lever by a brush mount pivot, the brush mount pivot only having a first pivot axis parallel to the base pivot axis;
wherein the brush mount comprises at least a first brush fixation means and a second brush fixation means wherein the brush mount pivot is between the first brush fixation means and the second brush fixation means, and
wherein a distance between the first brush fixation means and the brush mount pivot is larger than the distance between the second brush fixation means and the brush mount pivot.

2. A brush holder according to claim 1, wherein the distance between the first brush fixation means and the brush mount pivot is at least 10% larger than the distance between the second brush fixation means and the brush mount pivot.

3. A brush holder according to claim 1, wherein the brush mount is limited in its movement to the first plane.

4. A brush holder according to claim 1, wherein the brush mount is freely pivotable, within an angular range of 30 degrees or less, about an axis that is parallel to a base pivot axis.

5. A brush holder according to claim 1, wherein an angle between a first line between a brush mount pivot axis and a base pivot axis and a second line between a spring attachment point and the base pivot axis is in a range between 80° and 120°.

6. A brush holder according to claim 1, wherein an active brush contact area on a first side of the brush mount pivot is at least 10% larger than an active brush contact area on a second side of the brush mount pivot.

7. A brush holder according to claim 1, wherein the lever comprises a plurality of encapsulated hollow spaces to reduce lever weight.

8. A brush holder according to claim 1, wherein the lever includes at least one of a foam, a mesh structure, a honeycomb structure, a truss framework, a 3-D printed structure, or a structure with encapsulated hollow spaces.

9. A brush holder according to claim 1, wherein the spring is a tension spring.

10. A brush holder according to claim 1, wherein the spring is arranged parallel to the base.

11. A brush holder according to claim 1, wherein the spring is longer than the lever.

12. A brush holder according to claim 1, wherein the lever comprises a first lever section that holds the brush mount and a second lever section to which the spring is attached, wherein the base pivot is between the first lever section and the second lever section.

13. A brush holder according to claim 12, wherein the second lever section is shorter than the first lever section.

14. A brush holder according to claim 1, wherein the lever is a rigid lever.

15. A brush holder according to claim 1, wherein the brush mount is pulled by the spring in a direction away from the base and/or
the brush mount has a second pivot axis orthogonal to a first pivot axis.

16. A brush holder according to claim 1, wherein
the lever is an elastic lever which is bendable only in a movement plane orthogonal to a slipring rotation axis of a cylindrical slipring and/or orthogonal to a track surface of a disc shaped slipring,
the lever is firmly connected to the base, and
the brush mount is connected to the lever by a brush mount pivot being configured to pivot in the movement plane.

17. A brush holder according to claim 16, wherein the lever comprises two parallel wires.

18. A brush holder according to claim 1, further comprising:
a litz wire disposed between the brush mount and the base;
wherein, if the spring is a coil spring, the litz wire is extends through the coil spring.

19. A brush holder according to claim 1, wherein
the brush mount holds at least one sliding brush comprising at least one material selected from the group of materials consisting of: a sintered carbon material, a metal foam, and a bundle of wires.

20. A brush holder comprising:
a brush mount held by a lever at a base, wherein the lever is pivotably connected by a base pivot to the base, the base pivot having a base pivot axis,
a spring disposed between the base and the lever,
wherein the lever is limited in its movement within a first plane orthogonal to the base pivot axis,
wherein the brush mount is connected to the lever by a brush mount pivot, the brush mount pivot only having a first pivot axis parallel to the base pivot axis; and
wherein an active brush contact area on a first side of the brush mount pivot is at least 10% larger than an active brush contact area on a second side of the brush mount pivot.

21. A brush holder according to claim 20, wherein
the brush mount comprises at least a first brush fixation means and a second brush fixation means wherein the brush mount pivot is between the first brush fixation means and the second brush fixation means, and
a distance between the first brush fixation means and the brush mount pivot is larger than the distance between the second brush fixation means and the brush mount pivot.

22. A brush holder according to claim 21, wherein
the distance between the first brush fixation means and the brush mount pivot is at least 10% larger than the distance between the second brush fixation means and the brush mount pivot.

23. A brush holder according to claim 20, wherein
the brush mount is limited in its movement to the first plane.

24. A brush holder according to claim 20, wherein
the brush mount is freely pivotable, within an angular range of 30 degrees or less, about an axis that is parallel to a base pivot axis.

25. A brush holder according to claim 20, wherein
an angle between a first line between a brush mount pivot axis and a base pivot axis and a second line between a spring attachment point and the base pivot axis is in a range between 80° and 120°.

26. A brush holder according to claim 20, wherein
the lever comprises a plurality of encapsulated hollow spaces to reduce lever weight.

27. A brush holder according to claim 20, wherein
the lever includes at least one of a foam, a mesh structure, a honeycomb structure, a truss framework, a 3-D printed structure, or a structure with encapsulated hollow spaces.

28. A brush holder according to claim 20, wherein
the spring is a tension spring.

29. A brush holder according to claim 20, wherein
the spring is arranged parallel to the base.

30. A brush holder according to claim 20, wherein
the spring is longer than the lever.

31. A brush holder according to claim 20, wherein
the lever comprises a first lever section that holds the brush mount and a second lever section to which the spring is attached, wherein the base pivot is between the first lever section and the second lever section.

32. A brush holder according to claim 31, wherein
the second lever section is shorter than the first lever section.

33. A brush holder according to claim 20, wherein
the lever is a rigid lever.

34. A brush holder according to claim 20, wherein
the brush mount is pulled by the spring in a direction away from the base and/or
the brush mount has a second pivot axis orthogonal to a first pivot axis.

35. A brush holder according to claim 20, wherein
the lever is an elastic lever which is bendable only in a movement plane orthogonal to a slipring rotation axis of a cylindrical slipring and/or orthogonal to a track surface of a disc shaped slipring,
the lever is firmly connected to the base, and
the brush mount is connected to the lever by a brush mount pivot being configured to pivot in the movement plane.

36. A brush holder according to claim 35, wherein
the lever comprises two parallel wires.

37. A brush holder according to claim 20, further comprising:
a litz wire disposed between the brush mount and the base;
wherein, if the spring is a coil spring, the litz wire is extends through the coil spring.

38. A brush holder according to claim 20, wherein
the brush mount holds at least one sliding brush comprising at least one material selected from the group of materials consisting of: a sintered carbon material, a metal foam, and a bundle of wires.

39. A brush holder comprising:
a brush mount held by a lever at a base, wherein the lever is pivotably connected by a base pivot to the base, the base pivot having a base pivot axis,
a spring disposed between the base and the lever,
wherein the lever is limited in its movement within a first plane orthogonal to the base pivot axis,
wherein the brush mount is connected to the lever by a brush mount pivot, the brush mount pivot only having a first pivot axis parallel to the base pivot axis;
wherein the lever comprises a first lever section that holds the brush mount and a second lever section to which the spring is attached, wherein the base pivot is between the first lever section and the second lever section; and wherein the second lever section is shorter than the first lever section.

40. A brush holder according to claim 39, wherein
the brush mount comprises at least a first brush fixation means and a second brush fixation means wherein the brush mount pivot is between the first brush fixation means and the second brush fixation means, and
a distance between the first brush fixation means and the brush mount pivot is larger than the distance between the second brush fixation means and the brush mount pivot.

41. A brush holder according to claim 40, wherein
the distance between the first brush fixation means and the brush mount pivot is at least 10% larger than the distance between the second brush fixation means and the brush mount pivot.

42. A brush holder according to claim 39, wherein
the brush mount is limited in its movement to the first plane.

43. A brush holder according to claim 39, wherein
the brush mount is freely pivotable, within an angular range of 30 degrees or less, about an axis that is parallel to a base pivot axis.

44. A brush holder according to claim 39, wherein
an angle between a first line between a brush mount pivot axis and a base pivot axis and a second line between a spring attachment point and the base pivot axis is in a range between 80° and 120°.

45. A brush holder according to claim 39, wherein
an active brush contact area on a first side of the brush mount pivot is at least 10% larger than an active brush contact area on a second side of the brush mount pivot.

46. A brush holder according to claim 39, wherein
the lever comprises a plurality of encapsulated hollow spaces to reduce lever weight.

47. A brush holder according to claim 39, wherein
the lever includes at least one of a foam, a mesh structure, a honeycomb structure, a truss framework, a 3-D printed structure, or a structure with encapsulated hollow spaces.

48. A brush holder according to claim 39, wherein
the spring is a tension spring.

49. A brush holder according to claim 39, wherein
the spring is arranged parallel to the base.

50. A brush holder according to claim 39, wherein
the spring is longer than the lever.

51. A brush holder according to claim 39, wherein
the lever is a rigid lever.

52. A brush holder according to claim 39, wherein
the brush mount is pulled by the spring in a direction away from the base and/or
the brush mount has a second pivot axis orthogonal to a first pivot axis.

53. A brush holder according to claim 39, wherein
the lever is an elastic lever which is bendable only in a movement plane orthogonal to a slipring rotation axis of a cylindrical slipring and/or orthogonal to a track surface of a disc shaped slipring,
the lever is firmly connected to the base, and
the brush mount is connected to the lever by a brush mount pivot being configured to pivot in the movement plane.

54. A brush holder according to claim 53, wherein
the lever comprises two parallel wires.

55. A brush holder according to claim 39, further comprising:
a litz wire disposed between the brush mount and the base;
wherein, if the spring is a coil spring, the litz wire is extends through the coil spring.

56. A brush holder according to claim 39, wherein
the brush mount holds at least one sliding brush comprising at least one material selected from the group of materials consisting of: a sintered carbon material, a metal foam, and a bundle of wires.

* * * * *